United States Patent

[11] 3,558,085

| [72] | Inventor | John W. Magill |
| | | 664 N. Michigan Ave., Chicago, Ill. 60611 |
| [21] | Appl. No. | 785,162 |
| [22] | Filed | Dec. 19, 1968 |
| [45] | Patented | Jan. 26, 1971 |

[54] AIRPORT SURFACE LAYOUT
1 Claim, 1 Drawing Fig.

| [52] | U.S. Cl. | 244/114 |
| [51] | Int. Cl. | B64f 1/00 |
| [50] | Field of Search | 244/114 |

[56] References Cited
UNITED STATES PATENTS

| 1,850,490 | 3/1932 | Bahl | 244/114 |
| 1,903,847 | 4/1933 | Wood, Jr. | 244/114 |
| 2,400,841 | 5/1946 | Rogers | 244/114 |
| 2,487,613 | 11/1949 | Stone | 244/114 |
| 2,522,144 | 9/1950 | Stump | 244/114 |
| 2,765,994 | 10/1956 | Jordanoff | 244/114 |

OTHER REFERENCES
Aviation Week & Space Technology, October 31, 1966. Pages 145— 148, 153, 157— 159
Flight-10 June 1955, Page 816

*Primary Examiner*—Milton Buchler
*Assistant Examiner*—Paul E. Sauberer
*Attorney*—Norman H. Gerlach

ABSTRACT: An airport surface layout including a system of separate takeoff and landing runways which are oriented in accordance with predominantly prevailing winds, together with separate geographically located terminals and a central control tower.

PATENTED JAN 26 1971
3,558,085
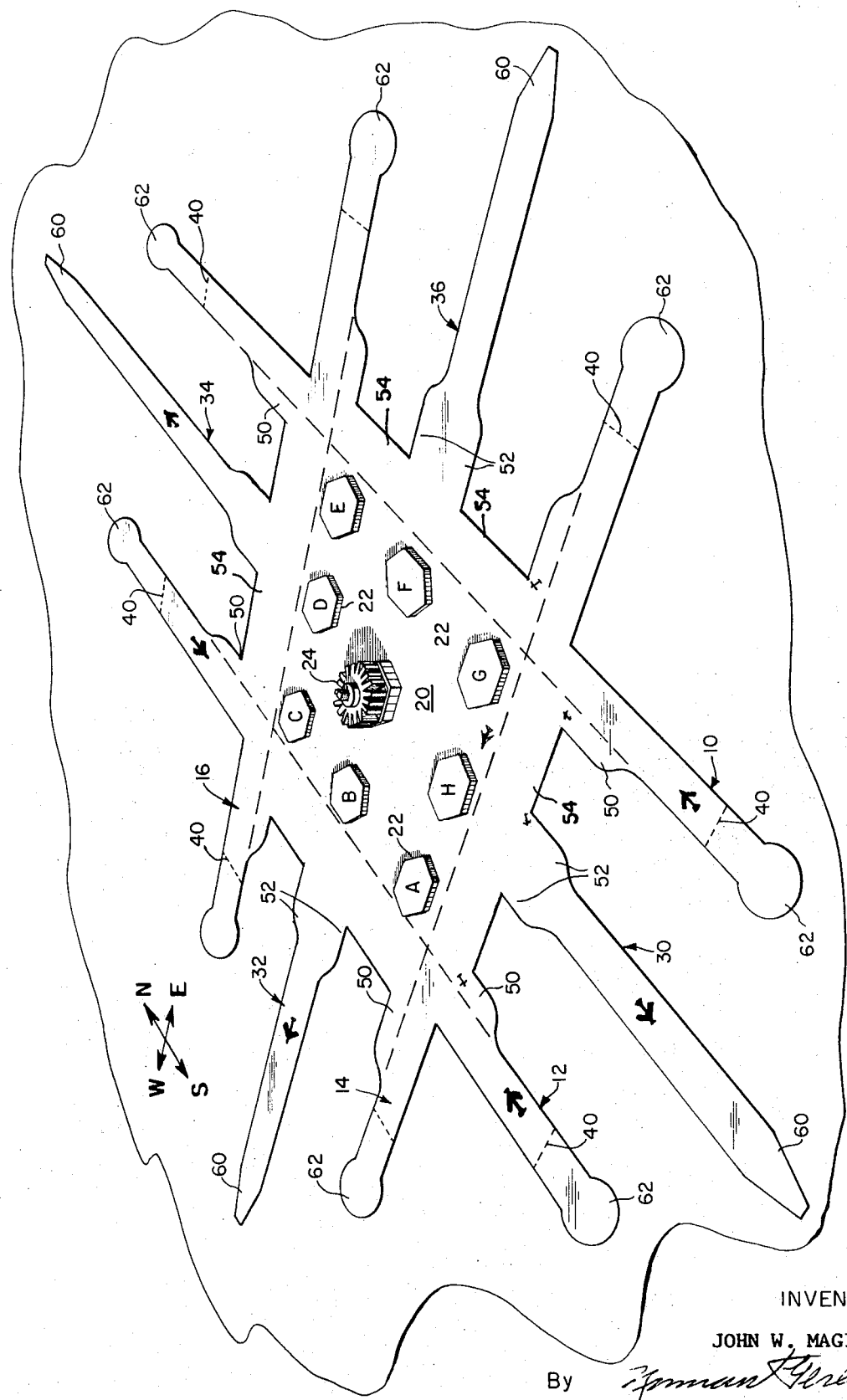
INVENTOR:
JOHN W. MAGILL
By *Norman Gerlach*
Attorney

AIRPORT SURFACE LAYOUT

The present invention relates to a surface layout for airports and includes a system of aircraft runways which provides for safe landing and takeoff of airplanes in various directions, as well as an arrangement of passenger terminals which are so disposed with respect to the runways as to eliminate needless or prolonged taxiing in bringing a given airplane from its touchdown point to its associated or proper passenger terminal.

Despite the reduction of risks in normal flying incident to continued perfection of aircraft, improved instruments and control tower techniques, the risks which accrue because of steadily increasing congestion in and around airports present a number of serious problems, principal among which is the safe landing of airplanes with their passengers and cargos. Other problems of a lesser nature, but nevertheless of considerable importance to the passengers and crew, is the time factor which is involved in bringing a given airplane promptly to its proper passenger terminal after it has entered the confines of the airport, the minimizing of taxing after the initial touchdown, and the accessibility of vehicular traffic by means of which passengers may enter and leave the airport.

The present invention obviates these difficulties by providing a system of runways including a series of four arrival runways which intersect one another in tic-tac-toe fashion and define a central substantially square flight deck on which there are disposed a multiplicity of separate passenger terminals. From the central portion of each such arrival runway there extends outwardly a departure runway, there thus being four such departure runways. Each departure runway extends parallel to the two arrival runways between which it is disposed. The four departure runways thus extend radially outwardly away from a central point on the flight deck but do not enter the confines of the latter.

Preferably the entire system of runways is oriented in accordance with the primary prevailing winds at the particular location of the airport, one pair of departure runways extending parallel to such prevailing winds. The disposition of the departure runways in this manner obviously fixes the orientation locations of the arrival runways, as well as of the flight deck. However, regardless of such fixed orientation, the placement of the various passenger terminals within the flight deck may be such that these terminals will accommodate airplane arrivals from directional geographic locations i.e., north, south, east and west regions of the country, so that a given airplane will encounter the shortest possible ground travel after touchdown on the particular arrival runway to which it is assigned by the personnel in the airport control tower. Runway lengths and widths are calculated to accommodate landing and takeoff of the largest expected airplanes using the airport while taxiways are provided at certain runway junctures so that smaller airplanes may avoid the right angle turns which the larger airplanes are obliged to make in approaching and leaving their respective passenger terminals, thus giving these smaller airplanes a more direct approach to their proper terminals. Although the tic-tac-toe arrangement of intersecting runways is ordinarily effected by a 90° disposition of all intersecting runways, a lesser angular disposition within small limits may be found expedient to accommodate variable factors such as known prevailing secondary winds, available land boundaries or unevenness of terrain.

The airport layout of the present invention possesses the advantage of affording a greater percentage of favorable wind conditions for airplane takeoff and landing than is possible with conventional runway layouts or systems, as well as affording shorter periods of airplane ground travel. However, numerous ancillary advantages also accrue from the present airport layout. Among these advantages are the central location of the flight deck so that arrivals from four geographic directions are possible. Underground facilities immediately beneath the flight deck on a multilevel basis enhance the usefulness of the present layout and among these facilities may be subsurface rail transportation to and from the airport, automobile parking, airport maintenance facilities, administration offices, public utility installations, private concessions and other airport conveniences too numerous to mention. The provision of an airport layout such as has briefly been outlined above constitutes the principal object of the present invention.

Other objects and advantages not at this time enumerated will readily suggest themselves as the following description ensues.

The invention consists in the several novel features which are hereinafter set forth and are more defined by claims at the conclusion hereof.

The single figure in the accompanying one sheet of drawings forming a part of this specification is a perspective view of an exemplary airport layout embodying the present invention, it being understood that the geographic location of the airport layout may dictate certain variations which are largely of a directional nature but which do not depart from the basic concept of the invention.

Referring now to the drawing in detail, the illustrated airport layout requires a plot of sufficient area to permit the construction of arrival runways which are approximately 16,000 to 18,000 feet in length if large commercial airplanes are to be accommodated. Such figures are only exemplary and may vary greatly according to the type of aircraft operating to and from the airport and the character of the terrain surrounding the latter. If the airport is in the immediate vicinity of a large metropolitan area, underground facilities may be provided for vehicular or rail traffic to and from the airport but, if it is located an appreciable distance from a metropolitan area, at least one side of the plot should be located adjacent to a roadway, preferably an expressway. If the airport is not land based, only directional consideration need be considered as will be set forth in detail presently.

The airport layout includes or comprises a series of four arrival runways 10, 12, 14 and 16 which, in the exemplary form of the invention are approximately 16,000 to 18,000 feet in length and intersect one another in tic-tac-toe fashion and at an angle on the order of 90°. Frequently, and at many installations or locations, the angle of intersection between the arrival runways will be precisely 90° but, where wind conditions that will be pointed out presently justify a departure from such an angle, a 10° departure or less from a right angle may be resorted to. The exemplary form of the invention will be considered to embody 90° angles between intersecting arrival runways and specific runway lengths and other dimensions will be referred to hereinafter but it will be understood that these angles and lengths may be varied within limits to accommodate different installations.

Still considering only the four arrival runways 10, 12, 14 and 16, their arrangement in four directions is entirely symmetrical and the width of each runway is on the order of 1,000 feet. The distance between adjacent parallel runways is on the order of 6,000 feet. The four runways thus define a central area 20 which is square, involves 13,000 feet on each side. This central area 20 constitutes a flight deck within which there is arranged a series of eight terminal buildings 22 which, for convenience of description, have been labeled A, B, C, D, E, F, G, and H respectively. These buildings may be of any shape but they are shown herein as being of hexagonal design. At the exact center of the flight deck 20 there is located a control tower 24. The terminal buildings 22 labeled A, C, E and G are disposed in the corner regions of the square flight deck 20 while the buildings labeled B, D, F and H are disposed near the midpoints of the four flight deck sides.

The airport layout also includes or comprises a series of four departure runways 30, 32, 34 and 36, each of which is approximately 12,000 feet in length and 1,000 feet in width. These four departure runways intersect the center of the four arrival runways 10, 12, 14 and 16 respectively and project radially outwardly in parallelism with the various pairs of arrival runways between which they are disposed. Thus, the four terminal buildings B, D, F and H are positioned so that they directly oppose the proximate or inner ends of the departure runways 30, 32, 34 and 36 respectively.

Each of the four arrival runways 10, 12, 14 and 16 is designed for aircraft landings in opposite directions so that, in effect, each of these runways is a dual runway, with the series of arrival runways presenting eight landing possibilities, it being understood, of course, that landings on any given arrival runway will take place near the ends thereof with the aircraft approaching one corner of the flight deck. Dotted lines 40 have been indicated across these four runways to represent the approximate touchdown points for the aircraft, these points being approximately 3,000 feet inwards from the ends of such runways.

The character of the various runways, both arrival and departure, is a matter of preference, it being essential that each runway provides a firm and relatively smooth upper surface. For land based airports the runways may be concrete fills whereas for island-type airports concrete slabwork on pylons or the like may be employed. Irrespective, however, of the particular character of the runways, the essential features of the invention are not disturbed.

The directional characteristics of the arrival and departure runways will vary according to a combination of two factors, namely geographic location of the airport and prevailing winds at such location. Ordinarily, it is desirable that one pair of longitudinally aligned departure runways and the two arrival runways which extend parallel thereto extend so that they are coincident with the prevailing wind at the particular airport location. However, geographical consideration may modify the orientation of the runways. For example, an airport which is located in the central region of the United States will receive and dispatch aircraft from four general directions, namely, north, south, east and west so that, in such an instance, it would be expedient to position the runways 12, 36 and 16 so that they extend in a north-south direction. On the other hand, if prevailing winds at such a central location are predominantly in either an eastern or western direction, a compromise resulting in a north to south direction and to arrange the arrival runways at a less than 90° angle with respect to the departure runways so that they too may afford the benefit of landings in the face of the wind. Although the directional arrangement of runways from a navigational standpoint constitutes no part of the present invention, the tic-tac-toe arrangement of arrival runways with intervening departure runways nevertheless, when correlated according to good navigational practice as outlined above, provides for ready distinguishment between arrival and departure runways by an aviator in the sky and also affords simultaneous landings from both the same general direction and opposite directions without confusion, difficulty or hazard.

It will be understood that in accordance with conventional practice the various arrival and departure runways may be distinguished from each other by suitable indicating means such as a series of yellow lights appropriately spaced along the landing or arrival runways and blue lights similarly spaced along the departure runways.

It will be understood that the touchdown points 40 for airplanes of different wingspread or weight will vary. In general, small aircraft will land on the arrival runways at points closer to the flight deck than the touchdown points for large and heavy aircraft. To accommodate such smaller aircraft, the arrival runways 10, 12, 14 and 16 are provided with taxiways 50 at their regions of juncture while the departure runways are provided with similar taxiways 52 at the regions where they join the central portions of the arrival runways. Additionally, the arrival runways 12, 14, 16 and 18 have widened central regions which, in effect, constitute taxiways 54 which connect the taxiways 50 and 52.

The arrival taxiways 50 may be regarded as inside taxiways in that they are in the form of widened areas which add approximately 500 feet to the width of the associated runways on the sides thereof inwards of the parallel pairs of arrival runways in the tic-tac-toe arrangement. The length of these taxiways 50 may be on the order of 1,500 feet. The departure taxiways 52 are of similar dimensions but they are dual taxiways in that they are provided on each side of the departure runways 30, 32, 34, 36. Whereas, the larger aircraft are obliged to make approximate 90° turns when entering or leaving the flight deck from the various arrival runways, smaller aircraft may make short cuts by using the taxiways 50, 52 and 54.

Considering now the arrangement of the various terminal buildings 22 within the confines of the central area 20 constituting the flight deck, these buildings, as aforesaid, are arranged according to geographical considerations rather than proprietary airline considerations. For example, assuming the airport to be located in a central part of the United States such as near St. Louis, Missouri, with the flight deck having its four sides extending north, south, east and west respectively, the buildings 22 labeled B and G will be disposed centrally alongside the north and south boundary lines of the flight deck respectively, while the buildings labeled D and E will similarly be positioned alongside the west and east boundary lines. The building G will accommodate arrivals and departures coming from or going to northern cities such as Bismark, North Dakota or St. Paul, Minnesota while the building labeled B will accommodate arrivals from and departures to such cities as New Orleans, Louisiana or Galveston, Texas. By the same token, the building labeled D will accommodate departures and arrivals associated with San Francisco, California or Reno, Nevada and most other west coast cities, while the building labeled E will accommodate such cities as New York, New York or Washington, D.C. On the same directional basis, the building labeled F will accommodate departures and arrivals from and to northwestern cities such as Portland, Oregon or Seattle, Washington. The building labeled H will take care of departures and arrivals from northeastern cities such as Boston, Massachusetts and Buffalo, New York. Southeastern departures and arrivals to and from such cities as Atlanta, Georgia or Miami, Florida will be accommodated by the building labeled C. Finally, southwestern departures to and from such cities as Dallas, Texas or San Diego, California will be accommodated by the building labeled A.

In order that a pilot in flight may readily distinguish the arrival runways from the departure runways under conditions of poor visibility such as heavy fog or the like, the extreme ends of the departure runways 30, 32, 34 and 36 are tapered as indicated at 60 while the extreme ends of the arrival runways 10, 12, 14 and 16 may be provided with bulbous rounded terminal ends as indicated at 62.

The arrangement of runways described above constitutes a basic runway pattern including a tic-tac-toe arrangement of arrival runways, whether the angles of intersection be right angles or acute angles, together with intervening departure runways which generally extend radially outwards from the sides of the flight deck. This basic runway pattern will at all times be preserved according to the present invention but, if desired, additional arrival or departure runways may be added to the pattern so as to intersect any of the runways providing, of course, the flight deck is maintained immune from traversing runways.

The invention is not to be limited to the precise arrangement of runways shown in the accompanying drawing or described in this specification as various changes in the details of construction may be resorted to without departing from the spirit or scope of the invention. Therefore, only insofar as the invention is particularly pointed out in the accompanying claim is the same to be limited.

I claim:

1. In an airport, a system of airplane runways comprising a series of four arrival runways of substantially equal length and arranged in intersecting tic-tac-toe fashion and defining a central rectangular flight deck of substantially equilateral configuration, each of said arrival runways being designed for airplane landings in either longitudinal direction, and a series of four departure runways, one for each arrival runway, extending outwardly in radially divergent fashion from the midpoints of the associated arrival runways in parallelism with adjacent arrival runways on the opposite sides thereof, and projecting radially outwardly an appreciable distance beyond the extreme ends of such arrival runways, said departure runways being designed for airplane takeoff purposes in a direction extending outwardly from the flight deck, the ends of said arrival runways being provided with enlarged landing areas and the ends of said departure runways being provided with reduced landing areas, the inner sides of the arrival runways outwardly and immediately adjacent to the flight deck being widened for a short distance so as to constitute arrival taxiways, and the opposite outer sides of the departure runways outwardly of and immediately adjacent to the flight deck being widened for a short distance so as to constitute departure taxiways.